R. F. HELLMUND.
SYSTEM OF CONTROL.
APPLICATION FILED JAN. 27, 1915.
1,335,107.
Patented Mar. 30, 1920.
2 SHEETS—SHEET 1.
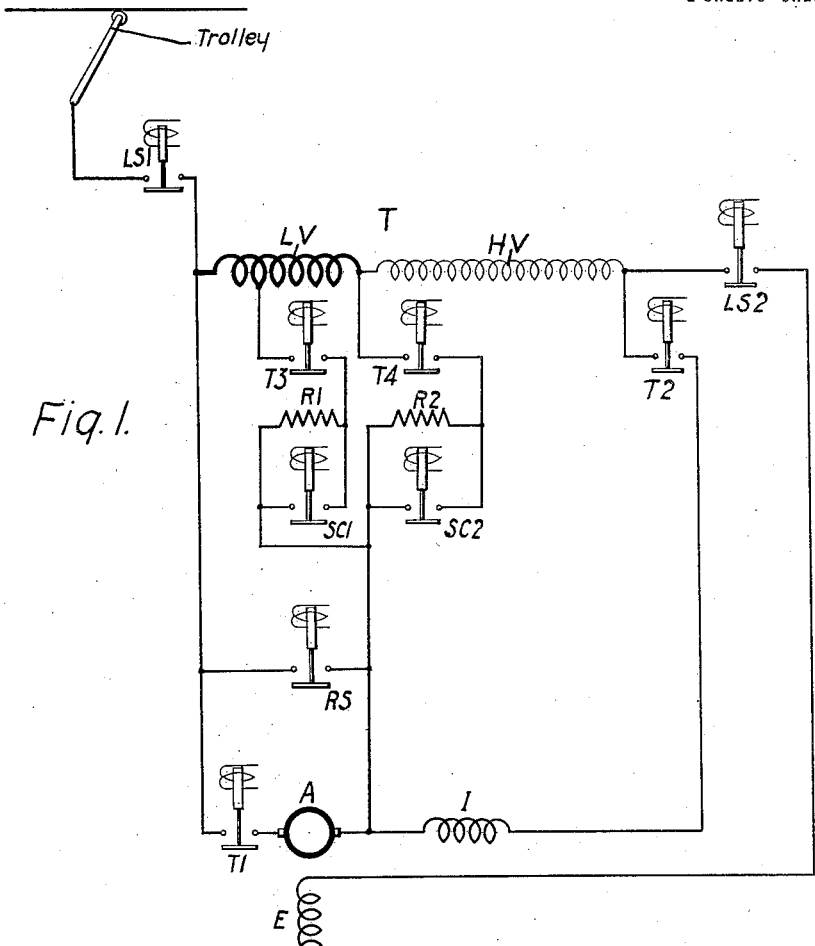
Fig. 1.
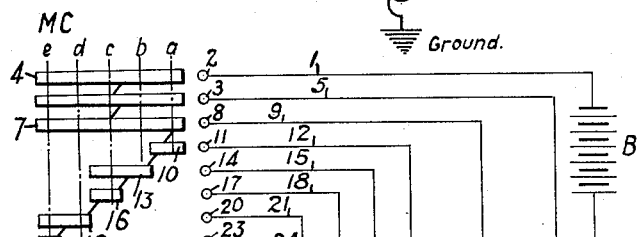

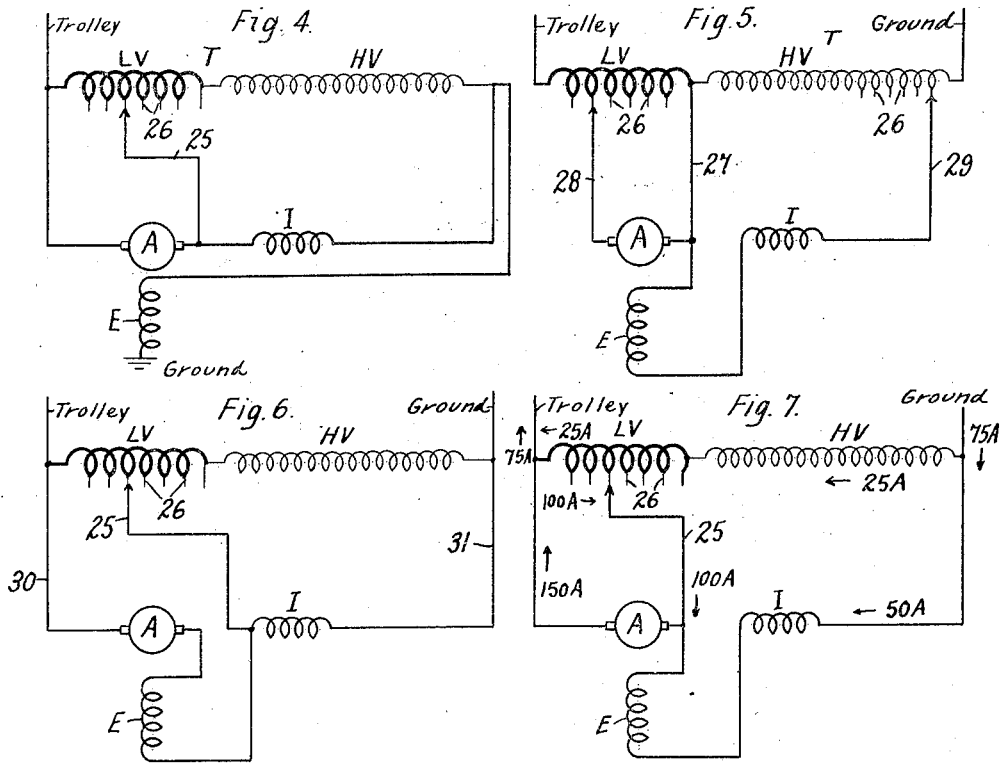

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,335,107.     Specification of Letters Patent.     Patented Mar. 30, 1920.

Application filed January 27, 1915. Serial No. 4,612.

*To all whom it may concern:*

Be it known that I, RUDOLF E. HELLMUND, a subject of the German Emperor, and a resident of Pittsburgh, in the county of Allegheny and State of Pennsylvania, have invented a new and useful Improvement in Systems of Control, of which the following is a specification.

My invention relates to systems of control, and it has special reference to the control of alternating current motors of the series commutator type.

One object of my invention is to provide means whereby the advantages of both high and low-voltage operation may be secured for the particular motor windings that are respectively adapted therefor.

Another object of my invention is to provide a control system embodying an arrangement of transformer windings and motor windings whereby the transformer may have an exceptionally small necessary capacity. Additional advantages of simplicity and flexibility of operation will appear from the description hereinafter given.

In the prior art, alternating-current motors of the class under consideration have generally employed single-winding suitably-energized auto-transformers that were provided with a plurality of taps for connection to the several field and armature windings of the motor. This method necessitated a transformer of relatively high-current capacity, as will be readily understood, inasmuch as a current proportional to the relatively heavy armature and field currents had to flow through the entire transformer winding. Attempts to increase the voltage impressed upon the motor beyond a certain limit have met with failure by reason of the barrier imposed by poor commutation of the current when the voltage across the armature exceeds a certain value which, as is well known, is relatively low.

According to my invention, I provide a transformer of relatively low necessary capacity for maintaining a desirably low voltage impressed upon the motor armature, at the same time securing to the other windings of the motor and to the control system in general, the advantages of high voltage operation, such as saving in cost, lightness of construction, simplicity of operation and the switching of relatively low currents. This result is accomplished by a certain arrangement of transformer and motor windings, as hereinafter more fully set forth.

In the accompanying drawings, Figure 1 is a diagrammatic view of the main circuits of a system of control embodying my invention; Fig. 2 is a diagrammatic view of an auxiliary system for manipulating the switches illustrated in Fig. 1 in accordance with the sequence chart of Fig. 3, of well known form; Fig. 4 is a simplified diagrammatic view that corresponds to Fig. 1; and Figs. 5 to 7, inclusive, are diagrams similar to Fig. 4 and showing various modifications of my invention.

Referring to Fig. 1, the system shown comprises a suitable supply circuit including a positive conductor marked "Trolley" and a negative conductor marked "Ground;" an auto-transformer T comprising two series-connected windings LV and HV, the former being adapted to deliver relatively low-voltage, high-current energy and the latter having relatively high-voltage, low-current characteristics; an alternating-current motor of the series commutator type comprising an armature A, a main or exciting field winding E that is connected in the supply circuit in series with the transformer T, and an inducing or compensating winding I that has a predetermined larger number of effective turns than the armature; a pair of transition resistors R1 and R2 for use in varying the voltage impressed upon the motor windings; a pair of suitable electrically-controlled switches LS1 and LS2 for connecting the auto-transformer T across the supply circuit; and a plurality of similar switches T1, T2, RS, T3, T4, SC1 and SC2, for manipulating the motor connections in a manner to be described.

Reference may now be had to Fig. 2 wherein the system shown comprises, in addition to the actuating coils of the various switches, a source of energy therefor, such as a battery B, and a suitable master controller MC that is adapted to occupy a plurality of motor-controlling positions *a* to *e*, inclusive.

For the sake of simplicity and clearness, the reversing switches that are customarily employed for reversing the electrical relations of the armature and main field winding of the motor are omitted from the diagrams of Fig. 1 and Fig. 2.

Assuming the master controller MC to be moved to its initial operative position $a$, the operation of the system illustrated may be described as follows:

A circuit is first completed from one terminal of the battery B through conductor 1, control fingers 2 and 3 which are bridged by contact segment 4 of the master controller, conductor 5, the actuating coils of the switches LS1 and LS2 and conductor 6 to the opposite terminal of the battery B. Another circuit is simultaneously established from an energized contact segment 7 of the master controller through control finger 8, conductor 9 and the actuating coils of the switches T1 and T2 to the negative conductor 6. A further circuit is established at this time from an energized contact segment 10 of the master controller through control finger 11 and conductor 12 to the actuating coil of the switch RS.

The auto-transformer is thus connected across the supply circuit, and the motor is connected across the auto-transformer with its armature A short-circuited by the switch RS and with its several windings disposed in series circuit relation.

It is a well-known fact that a weakened exciting field flux at the instant of starting an alternating-current motor of the commutator type is desirable in order to prevent excessive sparking at the brushes. Such field conditions are obtained by the set of connections just described, for the following reasons: A substantially zero voltage is impressed conductively upon the short-circuited armature and the step-down ratio of effective turns between the inducing field winding and the armature permits only a relatively small induced current in the latter. The "secondary" transformer current, that is, the total current traversing the low-voltage winding LV, being thus of relatively low value, the "primary" current, that is, the current traversing the high-voltage winding, and also the supply-circuit current assume relatively low respective values. Thus a weakened main field is obtained at starting in a relatively simple manner and without requiring the use of additional switches.

To effect further acceleration of the motor, the master controller MC may be moved to its second position $b$, whereupon an energized contact segment 13 engages a control finger 14, whence circuit is established through conductor 15 and the actuating coil of the switch T3. As soon as the switch T3 is closed, the armature short-circuiting switch RS is opened by reason of the disengagement of contact segment 10 and control finger 11.

The motor is thus provided with a doubly-fed connection, an intermediate conductor extending from a predetermined inner point of the transformer winding LV through the switch T3 and the transition resistor R1 to a point intermediate the armature A and the inducing field winding I. Upon movement of the master controller to the position $c$, a circuit is established from contact segment 16, through control finger 17 and conductor 18 to the actuating coil of the switch SC1, thereby effecting the exclusion from circuit of the resistor R1.

A similar accelerating step is effected by the actuation of the master controller to its position $d$, wherein an energized contact segment 19 engages a control finger 20, from which point a circuit is completed through conductor 21 and the actuating coil of the switch T4. As soon as the switch T4 is closed, the switches T3 and SC1 are opened by reason of the disengagement of the contact segments and control fingers of the master controller that are connected in their respective circuits.

Movement of the master controller to its final operative position $e$ effects the engagement of an energized contact segment 22 and control finger 23, whence circuit is established through conductor 24 and the actuating coil of the switch SC2.

At this point the intermediate motor connection extends from the junction-point of the transformer windings LV and HV through the switches T4 and SC2 to the above-mentioned motor-circuit point that is disposed intermediate the armature and the inducing field winding.

Referring to the simplified diagram of Fig. 4, the intermediate conductor 25 is represented as adapted to make variable contact with a plurality of taps 26 that are connected to different points in the transformer winding LV. It will be appreciated that the number of taps employed in any particular system is not an essential part of the invention and any desired number may be used.

It will be observed that, generally speaking, a relatively high-voltage, low-current circuit comprising the transformer winding HV is connected in circuit with the field winding I, and relatively low-voltage, high-current energy is supplied to the armature A, for reasons hereinbefore specified. By employing my control system, a material reduction in transformer capacity, as well as in space and weight, is obtained, as more fully set forth below. These advantages render my invention particularly adaptable for mining locomotives and the like, wherein relatively small size and weight of equipment is especially desirable. Moreover, the switching of heavy currents is considerably reduced and a decrease in the number of control switches may be made.

As noted above, the inducing field winding is provided with a larger number of effective turns than the armature. The number of inducing field winding turns is fixed with regard to the armature impressed voltage and the supply circuit voltage. The purpose of this arrangement of parts is to allow the entire inducing field winding current to be delivered directly from the supply circuit, while a portion of the armature current is delivered directly therefrom and an additional portion is supplied by the low-voltage winding of the transformer. Thus, with the armature connected across a predetermined portion of the low-voltage transformer winding, the inducing field winding circuit is adapted for connection across substantially the entire remaining portion of the auto-transformer to afford correct compensating conditions for the simultaneous armature current. In other words, the supply circuit delivers the total field circuit current directly to the inducing field winding, the remainder of supply-circuit current comprising the "primary" transformer current; while the field-circuit current comprises a portion of the armature current, and the remainder of the armature current is supplied by the "secondary" winding of the transformer, that is, the portion of the low-voltage transformer winding that is connected across the armature. Thus the field-circuit current is less than the supply-circuit current, with a consequent reduction in transformer capacity, whereas, in the prior art, so far as I am aware, the field-circuit current has always been greater than the supply-circuit currents, whereby the transformer winding itself had to supply current to the field-circuit and the necessary transformer capacity has been correspondingly high.

A simple numerical example, explained in connection with Fig. 7, will clearly illustrate the economy of necessary transformer capacity that may be effected by my invention.

Assume effective supply-circuit voltage= 220 volts, of which, during predetermined double-fed connection of the motor, 165 volts is impressed upon the transformer winding HV and 55 volts is impressed upon the transformer winding LV.

Assuming further instantaneous field-circuit current=50 amperes, and armature current=150 amperes, in the directions shown, under the conditions taken. The supply-circuit current thus equals 75 amperes, as shown in Fig. 7.

Then, since the field current comprises a portion of the supply-circuit current and of the armature current, and the remainder of the armature current returns to the transformer winding LV through the intermediate conductor 25 of Fig. 7, the necessary volt-ampere capacity of the winding LV= 55×(150−50)=5500 volt-amperes, and of the winding HV=165×(75−50)=4125 volt-amperes.

The current through the portion of the winding LV that is connected across the armature equals 75 amperes, which is comprised of the current of 100 amperes that traverses the intermediate conductor 25 and the oppositely-traveling current of 25 amperes that constitutes the "primary" transformer current.

The total volt-ampere energy consumption of the motor=165×50 (field circuit)+ 55×150 (armature circuit)=16500 volt-amperes.

Thus the necessary capacity of the transformer winding LV=⅓ of total motor energy consumption and=⅔ of armature energy consumption.

Inasmuch as the winding LV constitutes the "secondary" or output winding of the transformer, the rated necessary capacity of the transformer, consequently=⅓ of total motor energy consumption.

Again, the necessary capacity of the winding HV=¼ of total motor energy consumption and=½ of field winding energy consumption.

Other running conditions will in many cases afford still greater economies.

Referring to the modified system shown in Fig. 5, it will be observed that a point intermediate the transformer windings LV and HV is connected to a motor-circuit point intermediate the armature A and the field winding E, by a conductor 27, while a conductor 28 variably connects the outer terminal of the armature A to the transformer winding LV through a plurality of taps 26, and a conductor 29 similarly connects the outer terminal of the inducing field winding I to the transformer winding HV. When conductors 28 and 29 assume their respective outer positions, it will be observed that the circuit connections are substantially the same as those employed in the final condition of the system shown in Fig. 7.

Fig. 6 shows a system comprising the transformer windings LV and HV series-connected across the supply circuit, the armature A and the exciting field winding E that are connected by an outer conductor 30 and the variable intermediate conductor 25 across a predetermined portion of the low-voltage winding LV, and the inducing field winding I that is connected between the conductor 25 and a conductor 31 that is connected to the ground side of the supply circuit.

In Fig. 7, the only difference from the system shown in Fig. 6 resides in the fact that the intermediate conductor 25 is shown as connected to a point intermediate the armature and the exciting field winding of the motor, this type of double-fed connection being preferable or desirable under certain operating conditions.

It will be observed that the various operating advantages discussed in connection with the system of Fig. 1 are obtained to a greater or less degree in the several modified systems shown in Figs. 5, 6 and 7, and no further exposition thereof is deemed necessary.

Obviously, various other modifications of my invention may be made without departing from the spirit and scope thereof, and I desire, therefore, that only such limitations shall be imposed as are indicated in the appended claims.

I claim as my invention:

1. In a control system, the combination with an alternating-current motor of the series commutator type having an armature winding and an exciting and an inducing field winding, the latter having a larger number of effective turns than the armature, of an auto-transformer comprising a relatively high-voltage and a relatively low-voltage series-connected winding, means for connecting the inducing field winding outer terminal and the armature outer terminal to the outer ends of the first and the second transformer winding, respectively, means for connecting the armature inner terminal and the inducing-field-winding inner terminal to an inner point of said second transformer winding, and means for varying said last point of connection.

2. In a control system, the combination with an alternating-current motor of the series commutator type having an armature winding and an exciting and an inducing field winding, the latter having a larger number of effective turns than the armature, of an auto-transformer comprising a relatively high-voltage, and a relatively low-voltage series-connected winding, means for connecting the inducing field winding outer terminal and the armature outer terminal to the outer ends of the first and the second transformer windings, respectively, means for connecting the inducing field winding inner terminal to an inner point of said second transformer winding, and means for varying said last point of connection, the arrangement of windings being such that the current in said first field winding comprises the supply circuit current and the necessary capacity of said transformer is materially less than that of the motor windings.

3. In a control system, the combination with an alternating-current motor of the series commutator type having an armature, means for setting up an exciting field in the motor, and an inducing field winding, the latter having a larger number of effective turns than the armature, of a transformer comprising a relatively high-voltage and a relatively low-voltage series-connected winding, means for connecting the inducing-field-winding outer terminal and the armature outer terminal to the outer ends of the first and the second transformer winding, respectively, means for connecting the armature inner terminal and the inducing-field-winding inner terminal to an inner point of said second transformer winding, and means for varying said last point of connection.

In testimony whereof, I have hereunto subscribed my name this 26th day of January, 1915.

RUDOLF E. HELLMUND.

Witnesses:
F. H. SHEPARD,
R. R. MACDONALD.